Feb. 11, 1964 C. F. CARLSON ET AL 3,120,790

XEROGRAPHIC EXPOSURE APPARATUS

Filed Aug. 30, 1961 5 Sheets-Sheet 1

INVENTOR.
CHESTER F. CARLSON
ROBERT W. GUNDLACH
BY
ATTORNEY

INVENTOR.
CHESTER F. CARLSON
ROBERT W. GUNDLACH
BY
ATTORNEY

INVENTOR.
CHESTER F. CARLSON
ROBERT W. GUNDLACH
BY
ATTORNEY

XEROGRAPHIC EXPOSURE APPARATUS

INVENTOR.
CHESTER F. CARLSON
ROBERT W. GUNDLACH
BY
ATTORNEY

Feb. 11, 1964 C. F. CARLSON ET AL 3,120,790

XEROGRAPHIC EXPOSURE APPARATUS

Filed Aug. 30, 1961 5 Sheets-Sheet 5

INVENTOR.
CHESTER F. CARLSON
ROBERT W. GUNDLACH
BY [signature]
ATTORNEY

United States Patent Office 3,120,790

Patented Feb. 11, 1964

3,120,790

XEROGRAPHIC EXPOSURE APPARATUS

Chester F. Carlson, Pittsford, and Robert W. Gundlach, Victor, N.Y., assignors, by direct and mesne assignments, to Xerox Corporation, Rochester, N.Y., a corporation of New York Filed Aug. 30, 1961, Ser. No. 135,022
5 Claims. (Cl. 95—1.7)

This invention relates to xerography, and in particular, to a xerographic solid area coverage apparatus by which continuous tone and solid area images can be reproduced xerographically.

In the process of xerography, for example, as disclosed in either Carlson Patent 2,297,691, issued October 6, 1942, or in Carlson Patent 2,357,809, issued September 12, 1944, a xerographic plate, comprising a layer of photoconductive insulating material on a conductive backing, is given a uniform electric charge over its surface and is then exposed to the subject matter to be reproduced, usually by conventional projection techniques. This exposure discharges the plate areas in accordance with the radiation intensity which reaches them and thereby creates an electrostatic latent image on or in the plate coating.

Development of the image is effected with developer material or developers which comprise, in general, a mixture of a suitable pigmented or dyed electroscopic powder, hereinafter referred to as toner, and a granular carrier material, which later functions to carry and to generate triboelectric charges on the toner. More exactly, the function of the granular material is to provide the mechanical control to the powder, or to carry the powder to an image surface and, simultaneously, to provide almost complete homogeneity of charge polarity. In the development of the image, the toner powder is brought into surface contact with the coating and is held thereon electrostatically in a pattern corresponding to the electrostatic latent image. Thereafter, the developed xerographic image is usually transferred to a support or transfer material to which it may be fixed by any suitable means.

Excellent results have been obtained with this process, especially with cascade development using toner-carrier mixtures, in automatic continuous xerographic machines for line work such as letters or lines on a white background and for half-tone images.

Due to the electric field conditions in the region of the electrostatic image, however, large solid areas do not develop uniformly. Xerographic reproductions of such areas delineate their outline only, the centers not being developed or filled in with powder, unless a closely-spaced development electrode is used in the development zone. Continuous-tone images suffer in like manner, the tonal rendition being poor unless a development electrode is used. However, with continuous automatic equipment it is not usually feasible to provide a development electrode closely-spaced enough to the xerographic drum surface for the purpose without seriously interferring with the flow of developer and hence slowing down the speed of the machine, and also producing dangerous developer jamming at times.

U.S. Patent 2,598,732, to Walkup discloses a method of overcoming these difficulties in stationary flat-plate xerographic equipment by exposing the xerographic plate to a screen pattern in addition to the image pattern to be recorded, thereby breaking up the image into a half-tone pattern. However, Walkup has not disclosed means which are suitable for application to automatic continuous machines where the surface carrying the electrostatic image is moving, such as is the case with a rotating xerographic drum.

It is therefore the object of this invention to improve continuous xerographic apparatus for the rendition of such matter having variations in tonal value throughout all or part of the area being reproduced.

Another object of this invention is to improve xerographic reproducing apparatus affecting improved continuous tone rendition of images and solid area coverage of images being reproduced on a moving electrostatic image carrying surface.

Broadly, the present invention contemplates the exposure of a moving photoconductive insulating layer to an array of parallel lines of alternating light and shadow to form what might be called a "line half-tone pattern" superimposed upon the image being recorded. There are two embodiments of the invention, the first of which is applicable to the reproduction of images in a reversal sense, such as the production of positive xerographic images from negatives, as from microfilm negatives, for example. In this embodiment the image to be recorded is projected through a line half-tone screen of alternating opaque and transparent lines. In the second embodiment the original image is reproduced in a direct sense, that is, a positive original is reproduced as a xerographic positive copy. Here the line half-tone screen pattern is projected onto the moving surface either before or after the exposure to the image to be recorded.

It is also contemplated that the shadow casting member forming the array of parallel lines can be rendered inactive when it is not needed, either by moving it out of the optical path in the case of the first embodiment, or by turning off the projection lamp for the screen pattern in the case of the second embodiment.

For a better understanding of the invention as well as other objects and further features thereof, reference is had to the following detailed description of the invention to be read in connection with the accompanying drawings, wherein.

Figure 1:
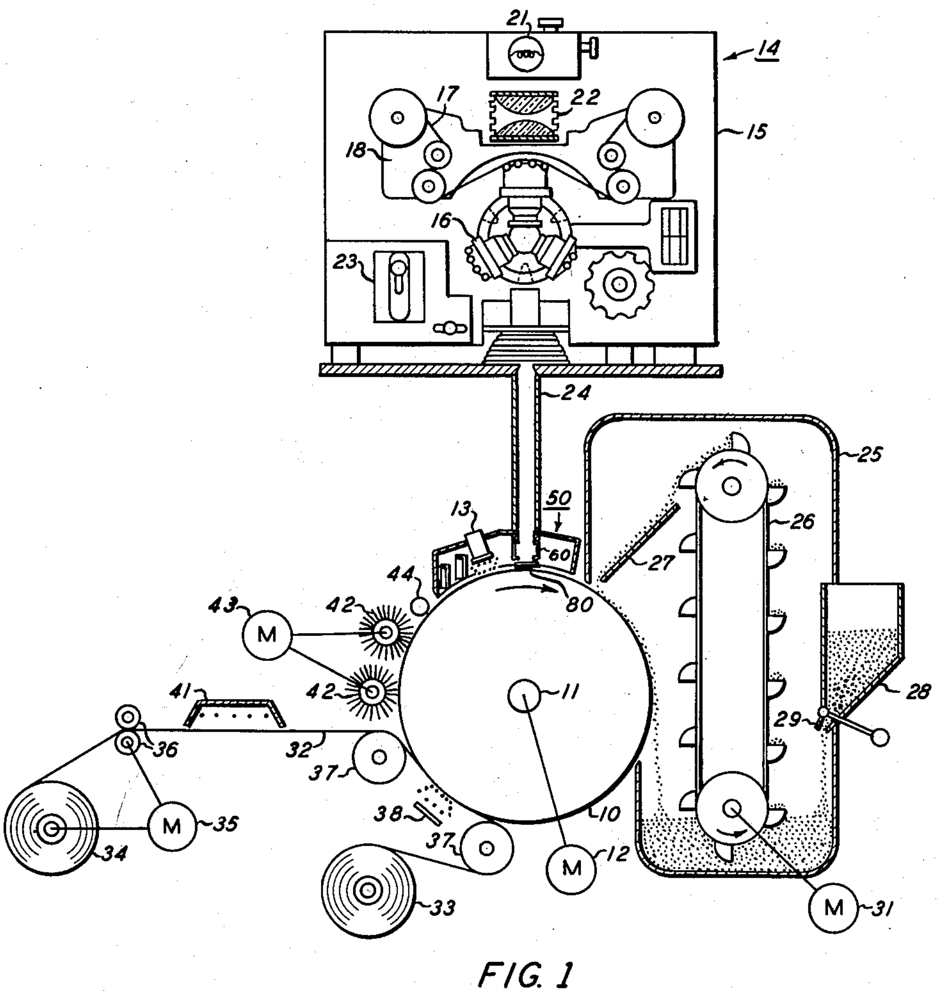
FIG. 1 illustrates schematically a xerographic apparatus adapted for continuous and automatic operation and incorporating the first embodiment of the solid area coverage device of the invention.
Figure 2:
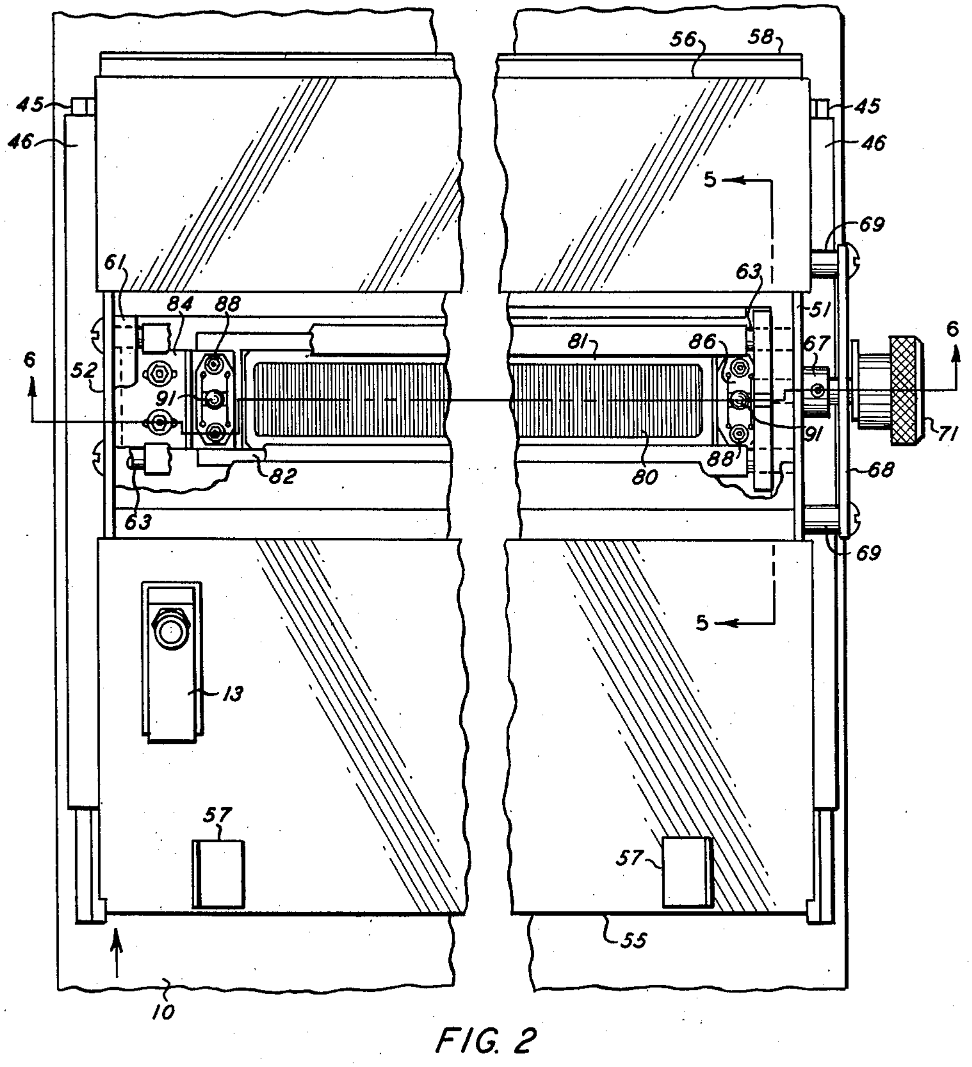
FIG. 2 is a top view of the exposure station of the xerographic apparatus with the projector mechanism removed.
Figures 3, 4:
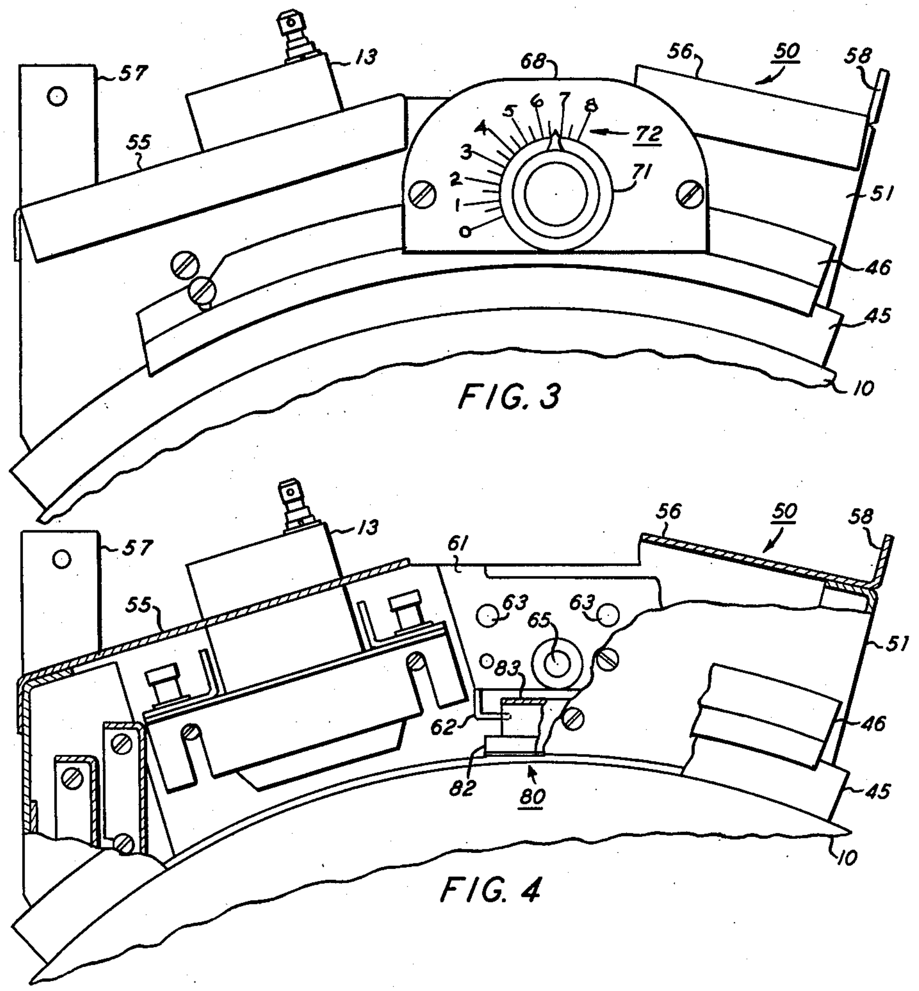
FIG. 3 is a front view of the exposure station of the xerographic apparatus with the projector mechanism removed.
FIG. 4 is a front view similar to FIG. 3 with parts broken away to show details of the structure.

As shown schematically in FIG. 1, the xerographic apparatus, adapted for continuous and automatic operation according to the first embodiment includes a xerographic plate including a photoconductive layer on a conductive backing and formed in the shape of a drum 10 which is secured to shaft 11 journaled in the frame (not shown) of the machine. Shaft 11 is connected operatively to synchronous motor 12 whereby the drum is caused to rotate in the direction indicated by the arrow to cause the drum surface sequentially to pass a plurality of xerographic processing stations.

As the drum is rotated an electrostatic charging unit 13, which may be of the type disclosed in Walkup Patent 2,777,957, serves to apply a uniform electrostatic charge over the photoconductive layer which is dissipated in part by a radiant image exposure of the original to be reproduced leaving thereon an electrostatic latent image corresponding to the image of the original.

Exposure of the charged drum surface to a radiation image, in the embodiment shown, is made by means of a microfilm projector of the type disclosed in copending application Serial No. 796,561, filed on March 2, 1959, in the name of Sten R. Johanson, exposing the drum surface through a solid area coverage device, constructed in accordance with the invention.

The microfilm projector, generally designated 14, mounted directly over the drum 10 in a box-like housing 15, has a rotatable lens turret assembly 16 adapted to provide a range of enlargements.

Film 17, usually negative microfilm in this embodiment, carried by microfilm carriage 18, is illuminated by projection lamp 21, the output of the lamp being concentrated by condenser lens 22 the focus cone of which is intersected by the film plane. The microfilm carriage 18 carrying the microfilm to be reproduced is moved in timed relation to the movement of the xerographic drum by a variable speed transmission 23 whereby a flowing radiation image is projected onto the drum surface to dissipate the drum charge in the exposed areas thereof and thereby form a latent electrostatic image of the copy to be reproduced.

Secured to the underside of the microfilm projector is a non-reflective image duct 24 extending vertically downward toward the drum and terminating in a hollow exposure box or light shield 50 having front wall 51, rear wall 52, side walls 53 and 54 and top panels 55 and 56 having depending flange portions secured to the upright walls of the light shield. Seals 45 retained by seal supports 46 adjustably secured to the front wall 51 and rear wall 52 are positioned in contact with the peripheral edge surface of the drum beyond the boundary of the photoconductive surface of the drum. The light shield and image duct cooperate with each other to exclude extraneous light.

The light shield 50 is suitably mounted, as by brackets 57 and 58 to the frame of the machine, directly above and in close proximity to the peripheral surface of the drum. In this position the light shield 50, which encloses the charging device 23, the exposure shutter mechanism 60 and screen pattern device 80, to be described in detail, protects the drum surface both during charging and exposure from extraneous light.

After the formation of the electrostatic latent image on the drum, the latent electrostatic image is developed by the use of a developing unit including a casing or housing 25 having a lower or sump portion for accumulating developer material. A bucket-type conveyor 26 having a suitable driving means 31 is used to carry the developing material to the upper part of the developer housing where it is cascaded down over a hopper chute 27 onto the xerographic drum. As the developing material is cascaded over the xerographic drum, toner particles are pulled away from the carrier component of the developing material and are deposited on the drum to form powder images, while the partly denuded carrier particles pass off the drum into the developer housing sump. As toner particle images are formed, additional toner particles are added to the developer material from the container 28 at a rate determined by a control gate 29.

After development, the image thus formed is transferred to support surface web 32, which may be of paper or any other suitable material. The web 32 is continuously transported from supply spool 33 to take-up spool 34 by a suitable paper handling apparatus, which may be of the type disclosed in the Crumrine et al. Patent, 2,781,705. The paper handling mechanism includes a synchronous motor 35 driving take-up spool 34 and drive rolls 36, while guide rolls 37 serve to direct the web into contact against a powder image on the surface of the xerographic drum. Electrostatic transfer unit 38, which may be of the type similar to unit 13, generates an electrostatic charge to electrostatically attract the powder image from the surface of the web 32.

Thereafter, image-bearing web 32 is transported through heat fuser 41, which may be of a type disclosed in Crumrine et al. Patent 2,852,651, serving permanently to affix the powder image thereto.

Any residual powder remaining on the surface of the drum after transfer is removed by means of rotating brushes 42 driven from motor 43 after which residual electrostatic charge on the drum is dissipated by illumination from lamp 44.

Referring now to the subject matter of the invention, exposure of the charge drum surface to a radiation image takes place continually. The exposure time is controlled by an exposure shutter which provides a slit opening or exposure slit which spans the photoconductive surface portion of the drum and corresponds to the shutter of a camera in that it is capable of varying the time factor of exposure. With the drum rotating at a peripheral speed of, for example, four inches per second, four inches of drum surface will pass under and given point of the exposure slit opening every second. Thus if the width of the slit is one inch, any given point of the image will be exposed onto a corresponding point on the drum surface throughout the entire period of time that it takes this point on the drum surface to traverse the one inch opening, or one fourth of the second exposure time. If the width of the slit is decreased to one-half inch, the exposure time will be the length of time required for a given point on the drum surface to travel one-half inch, or one-eighth second.

With this arrangement, the charge on the drum can be dissipated in the illuminated areas in accordance with image pattern of the original and the period of exposure, i.e., the charge remains on or in the photoconductive layer of the drum until exposed to the focused image from a copy, such as a negative microfilm, which then causes a release of charge proportional to the radiation from the copy. Possibly due to the configuration of the electrostatic field above the photoconductive layer, the electrostatic lines of force tend to concentrate at the edges of areas still carrying a charge after exposure.

Without the screen pattern applied by the present invention, the developing material, or toner, is attracted mainly to the areas where the electric fields are the highest and the lines of force most concentrated. This state of affairs is excellent for developing narrow lines and printed or typed characters, but where large solid areas are present in the original, they are not reproduced on development as solid areas of toner, but rather the toner will deposit heavily along the edges of the areas, and very little or none will deposit in the centers, resulting in an odd-looking copy. With continuous-tone originals similar effects are encountered.

In accordance with the present invention, these problems are overcome in rotating drum-type xerographic machines by the introduction in the exposure system of the machine, of a shadow-casting member comprising an array of parallel opaque lines or elements which break up the light into a line half-tone pattern. The resulting electrostatic images, after exposure, are therefore subdivided into a line half-tone pattern, resulting in a configuration of the electrostatic fields above the photoconductive surface which causes the uniform half-tone development of large solid areas and the rendering of continuous tones as half-tones.

In the first embodiment, illustrated in FIGS. 1 to 6, where a positive copy is to be produced from a negative original or film, the line screen is located in the optical system which projects the image to be recorded onto the drum, with the lines parallel to the direction of motion of the drum surface. The light areas of the negative are thereby broken up into alternate lines of charge and no-charge (or lower charge) on the exposed drum. The dark areas remain as uniformly charged areas on the drum surface.

Referring now to FIGS. 2 through 6, inclusive, the exposure shutter mechanism includes an open shutter frame 61 mounted within the light shield and in alignment with the opening therein and is secured at opposite ends to the front wall 51 and rear wall 52 of the light shield 50.

The exposure slit is formed by a pair of shutter gates 62 which extend across the usable width of the drum and are each secured to the squared portions of shafts 63 rotatably journaled at opposite ends in the shutter frame 61. Segmented gears 64 fixed to the right-hand ends of the shafts, as seen in FIG. 6, inboard of the frame, mesh with each other whereby movement of one segmented gear will be reflected by an equal but opposite movement of the other segmented gear to permit coordinated angular displacement of the shutter gates while maintaining the lower edges of the gates, actually forming the exposure slit, at an equal distance with respect to the center line of the optical path through the non-reflective image duct.

Figure 5:
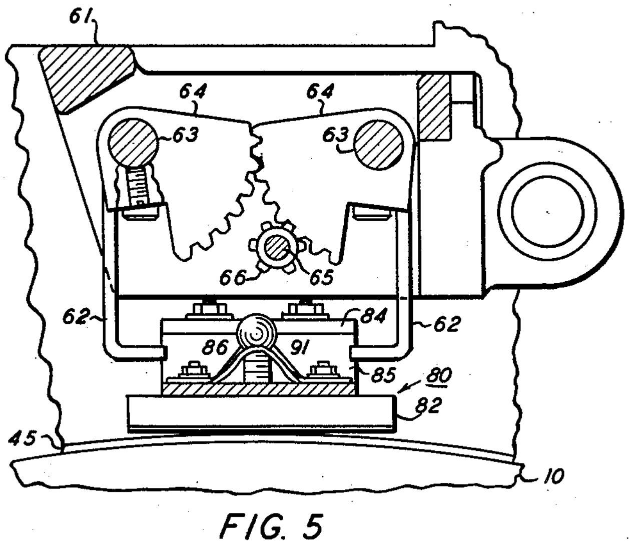
FIG. 5 is a sectional view taken along line 5—5 of FIG. 2.
Figure 6:
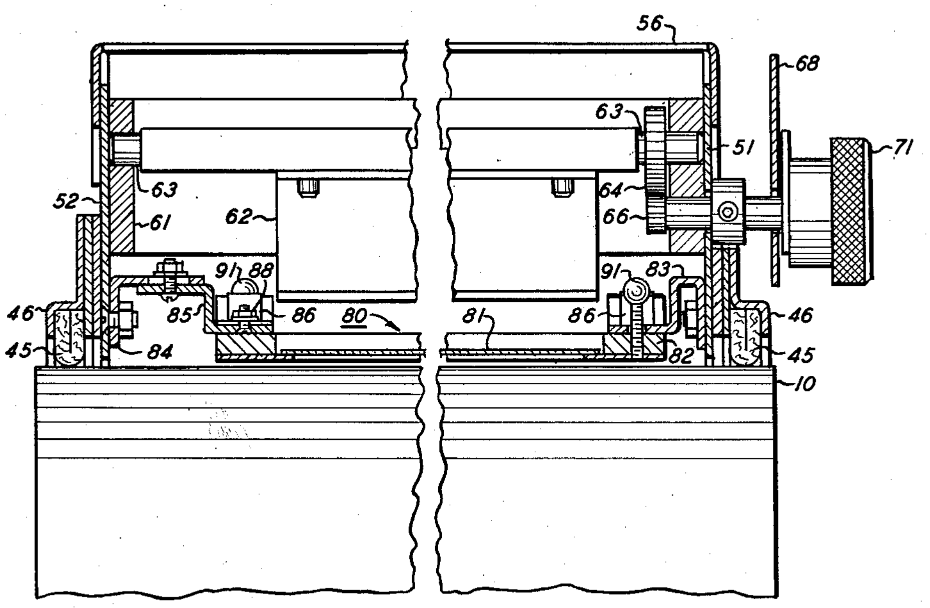
FIG. 6 is a sectional view taken along line 6—6 of FIG. 3.

A shaft 65 carrying a pinion gear 66 which meshes with a segmented gear 64, as seen in FIGS. 5 and 6, is rotatably journaled at one end in the shutter frame and maintained in axial alignment therewith by a set collar 67 and has its opposite end extending through a suitable aperture in the plate 68 secured in spaced relation to the light shield by spacers 67. A dial 71 secured to this shaft 65 has a pointer superposed over a calibrated scale 72 on the plate 68 which indicates the width of the exposure slit. By rotating the dial, the width of the exposure slit can be varied by the machine operator.

A screen pattern to break up charge retaining areas on the drum, is projected onto the drum through a comb-like screen 80. In the embodiment shown, the screen is formed on a thick plate of glass 81 which is provided with parallel opaque lines, preferably 150 lines to the inch for use in the xerographic machine shown; the opaque lines and the spacing between the opaque lines preferably being of equal width to provide a 50–50 ratio of clear and opaque areas. The opaque lines may be formed by ruling, or photographically.

The screened glass plate 81 is mounted in a recessed holder or open frame 82 positioned closely adjacent and directly over the drum. To support the holder there is provided a front bracket 83 adjustably secured to the front wall 51 of the light shield and a rear bracket 84 carrying a spring bracket 85, adjustably secured to the rear wall 52 of the light shield so that the spacing between the screened glass plate and the drum can be set as desired, it being noted that parallelism of the screened glass plate with the drum axis is fairly critical. Both the front bracket and the spring bracket have commercially available spring catches 86 secured thereto, as by screws 87 and nuts 88, each being adapted to receive the ball portion of ball studs 91 threaded into the holder whereby the holder carrying the screened glass plate is releasably secured to the brackets so that the screen can be removed when not required.

Screens useful as opaque line screens for making xerographic reproductions of solid area continuous tone images should have 50 lines to 300 lines per inch, the screens with the larger number of lines generally giving the more natural or higher quality results in continuous tone rendition. If less lines per inch are used, the half tone quality of the line image will be more apparent, whereas if more than 300 lines per inch are used, the beneficial effects of the line screen pattern on development are not fully realized. With the finer screens, i.e., more lines per inch, the screen pattern may be barely perceptible as such when developed and the reproduction will have more nearly the appearance of a continuous tone photograph. The lines of the screen must be substantially parallel to each other and all of the lines must be substantially normal to the axis of the drum to prevent exposure of the drum to overlapping lines of the screen.

With this arrangement of the screen pattern there will be produced on the drum an image of the original composed of line elements which can be adequately developed by any of the known xerographic developing processes to form continuous tone images and solid black area images.

With a carrier-toner cascade development system, such as is shown in FIG. 1, there are broadly two types of developers which may be used. In reversal developer the toner particles carry the same polarity electric charge as the charged areas of the xerographic drum (such as a positive charge). In positive developer the toner is charged oppositely to the charge on the drum A (negative toner when the drum charge is positive). For producing positive xerographic prints from negative film originals, it is usual, in line copying, to use reversal developer so that the positive toner will be driven by the electric field away from the charged areas and deposit on the discharged lines, to produce black lines in the copy from clear lines in the film. In the present system, since the screen breaks up the exposed areas into alternate lines of charge and no-charge either positive or reversal developer will develop the image as a positive. It is unimportant whether the powder deposits on the charge lines of the grid or between the lines. However, since fine lines and characters are also often present along with solid areas and continuous tone subjects, there is some distortion in these when positive developer is used to reproduce from negatives, and hence reversal developer is preferred for the embodiment of FIGS. 1 to 6.

Figures 7, 8:
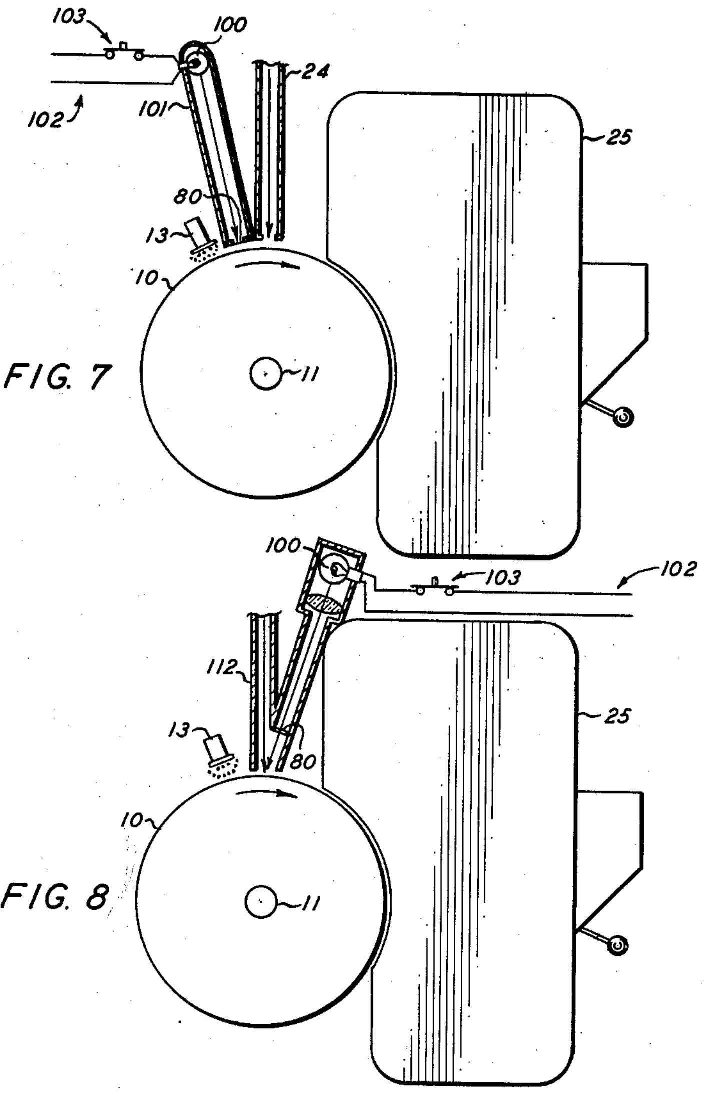
FIG. 7 is a schematic drawing illustrating a second embodiment of the invention.
FIG. 8 is a schematic drawing illustrating another structure incorporating the second embodiment of the invention.
Figure 9:
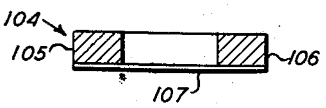
FIG. 9 shows a modified screen grid.

The second embodiment of the invention, in which positive copy is produced from positive originals, is shown schematically in FIGURES 7 and 9. Here it is necessary to break up the dark areas of the original into a line half-tone pattern. This is accomplished by exposing the entire drum surface to the screen shadow pattern either before, during, or after exposure to the image to be copied.

In the embodiment shown in FIG. 7, the drum 10 rotates past a corona charging device 13 which applies a uniform charge to the photoconductive coating, then past the screen exposure device, which comprises a lamp 100 at the upper end of a non-reflective light duct 101. The screen 80 is mounted at the lower end of the duct close to the surface of the drum. As before, the lines of the screen are parallel to the direction of travel of the drum surface and perpendicular to the axis of the drum. Lamp 100 may contain a light source which is substantially a point, or, as shown, it may contain a single filament parallel to the grid lines to cause the lines to cast sharp shadows on the drum. This produces a uniform grid charge pattern on the drum. The drum then passes under the image duct 24 through which a positive image is projected from positive film, for example. The image is then developed with either positive or reversal developers at the developing station within housing 25. In this case, positive developer produces the best results. Obviously, screen 80 and its associated light system can alternatively be mounted to the right of image duct 24 in FIGURE 7 with similar results in breaking up the dark areas of the image into a line screen pattern. Lamp 100 is energized through electric circuit 102 through switch 103. When the machine is to be used to reproduce exclusively line originals switch 103 can be opened to de-energize the lamp so the screen pattern will not be applied.

In FIG. 8, there is shown an alternate structure to permit exposure of the drum surface to the screen shadow pattern during exposure of the drum surface to the image to be copied. In this embodiment, the screen 80 is mounted in a non-reflective light duct 111 which intersects the image duct 112, similar to duct 24, at an angle close to the surface of the drum whereby the screen pattern and the image converge at the surface of the drum.

FIGURE 9 shows another form of screen which may be used instead of screen 80. It consists of a rectangular rigid metal frame having two side bars 105 and 106 between which are strung an array of parallel blackened wires or filaments 107 which are welded or soldered to the under face of the frame. These filaments cast parallel shadows onto the drum surface.

While the invention has been described with reference to the structures disclosed herein, it is not confined to the specific details set forth, and this application is intended to cover such modifications or changes as may come within the purposes or scope of the following claims.

What is claimed is:

1. An exposure mechanism for use in a xerographic reproducing apparatus including a xerographic plate mounted for rotation, a charging device to place a uniform electrostatic charge on the drum, and an optical projector to focus a radiation image of an original onto a charged area of the xerographic plate to form an electrostatic latent image on the xerographic plate; said exposure mechanism including a semitransparent plate, containing substantially parallel opaque lines thereon and substantially parallel transparent lines therebetween, said opaque lines and the spacing between said opaque lines being of equal width, and a holder for said plate positioned adjacent said xerographic plate to maintain said plate substantially parallel to the axis of rotation of said xerographic plate with said opaque lines positioned substantially parallel to the path of travel of said xerographic plate.

2. An exposure mechanism for use in a xerographic reproducing apparatus including a xerographic plate mounted for rotation, a charging device to place a uniform electrostatic charge on the drum, and an optical projector to focus a radiation image of an original onto a charged area of the xerographic plate to form an electrostatic latent image on the xerographic plate, said exposure mechanism including a semitransparent plate, containing alternate parallel opaque lines and parallel transparent lines thereon, the opaque lines and the transparent lines being of equal width, there being between 50 to 400 opaque lines per inch, and a holder for said plate positioned adjacent said xerographic plate to maintain said plate substantially parallel to the axis of rotation of said xerographic plate with said lines positioned substantially parallel to the path of travel of said xerographic plate.

3. In a xerographic apparatus of the type in which a flowing image is projected from an original by a projector onto a xerographic plate moving at a constant rate, a light shield positioned adjacent said xerographic plate, a pair of shutter gates supported in said light shield about the optical center line from said projector for pivotable movement to form a variable width exposure slit, means to pivot said shutter gates to vary the spacing of said shutter gates with respect to the optical center line to vary the width of said exposure slit and therefore to vary the time that the xerographic plate is exposed to a flowing image, a semitransparent plate extending transversely to said xerographic plate and of a useable width at least equal to the maximum width of said exposure slit, said semitransparent plate containing substantially parallel opaque lines thereon and substantially parallel transparent lines therebetween, said opaque lines and the spacing between said opaque lines being of equal width, and a holder for said semitransparent plate positioned between said xerographic plate and said shutter gates in said light shield to maintain said semitransparent plate substantially parallel to the surface of said xerographic plate with said opaque lines of said semitransparent plate positioned substantially parallel to the path of travel of said xerographic plate.

4. An exposure device for breaking up the electrostatic charge on the surface of a moving xerographic plate into a line screen pattern, comprising, in combination, a screen composed of opaque line elements interposed with transparent line areas, means for supporting said screen in closely-spaced relation to said plate with said line elements parallel to the direction of motion of the surface thereof, and a light source over said screen on the side away from said plate for projecting a substantially parallel light beam through said screen onto said plate surface to cast shadows of said opaque line elements onto said surface.

5. In a xerographic copying machine of the class wherein a photoconductive insulating surface is moved past a charging station at which an electrostatic charge is applied thereto, then past at least one exposure station containing a light source for exposing said surface, and then past a development station at which developing powder is applied to said surface, the combination with said light source of a line screen between said source and said surface, said screen comprising alternate transparent and opaque lines parallel to the direction of travel of said surface, to discharge said surface in a line screen pattern.

References Cited in the file of this patent

UNITED STATES PATENTS

| | | |
|---|---|---|
| 2,211,345 | Murray | Aug. 13, 1940 |
| 2,282,337 | Mies | May 12, 1942 |
| 2,598,732 | Walkup | June 3, 1952 |
| 2,844,123 | Hayford | July 22, 1958 |